Figure 1:
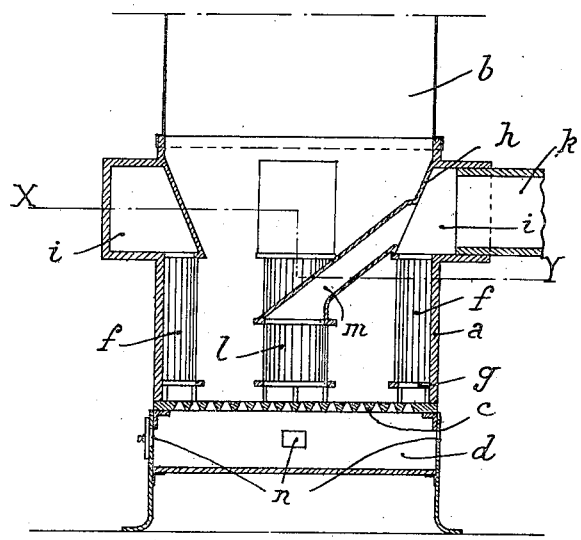

J. JOUCLARD.
STOVE ADAPTED TO BURN SAWDUST, SHAVINGS, AND LIKE WORKSHOP REFUSE.
APPLICATION FILED AUG. 23, 1921.

1,428,782.

Patented Sept. 12, 1922.
6 SHEETS—SHEET 1.

Inventor.
Jules Jouclard,
By Henry Ortt
Atty

J. JOUCLARD.
STOVE ADAPTED TO BURN SAWDUST, SHAVINGS, AND LIKE WORKSHOP REFUSE.
APPLICATION FILED AUG. 23, 1921.

1,428,782.

Patented Sept. 12, 1922.
6 SHEETS—SHEET 3.

Inventor
Jules Jouclard.
By Henry Ott, Atty

Patented Sept. 12, 1922.

1,428,782

UNITED STATES PATENT OFFICE.

JULES JOUCLARD, OF VERSAILLES, FRANCE.

STOVE ADAPTED TO BURN SAWDUST, SHAVINGS, AND LIKE WORKSHOP REFUSE.

Application filed August 23, 1921. Serial No. 494,538.

*To all whom it may concern:*

Be it known that I, JULES JOUCLARD, a citizen of the Republic of France, residing in Versailles, Seine-et-Oise, France, have invented certain new and useful Improvements in Stoves Adapted to Burn Sawdust, Shavings, and like Workshop Refuse (for which I have filed applications in France October 19, 1918, and February 6, 1919), and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

My invention relates to a stove which is specially constructed for the continuous burning of sawdust, shavings or like workshop refuse, by a slow or rapid combustion.

The said stove is constituted in principle by a cylindrical body whose bottom part is provided with a grating and whose lateral walls constitute for the whole or a part of the surface thereof, other gratings forming small chimneys communicating with a main collecting chamber for the discharge of the gases of combustion. The central portion is also provided with a grate surface in the majority of cases. As regards the lower grating, it serves to admit the air required for the combustion. The device is completed by a receptacle disposed upon the main body of the stove and by a special feeding device fitting upon the said receptacle whereby the feeding of the latter may be effected during the operation of the said stove, obviating at the same time all production of dust.

In the said device, the lateral surface of the receptacle containing the sawdust is provided with projecting portions which are limited by the vertical grate bars. The device also contains at the center of the said receptacle another portion of vertical disposition formed by grate bars. This portion has a cylindrical shape and is connected with the chimney by a passage traversing the receptacle which is filled with sawdust. The presence of these parts within the sawdust will give rise to a certain difficulty in the downward feed during the progress of the combustion.

In a modified form of construction, the hereinbefore described parts are replaced by a transverse member in the form of a passage or support having an apertured surface and extending between two of the vertical passages projecting at the sides. Various accessory devices have also been provided for the discharge of the ashes.

The following description, together with the accompanying drawings which are given by way of example, sets forth various embodiments of my invention.

Figure 2:
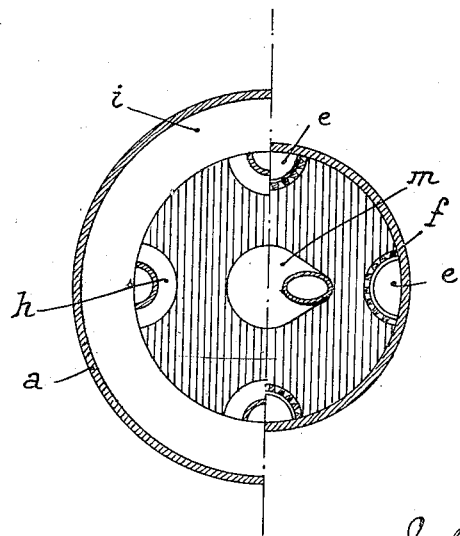
Figure 3:
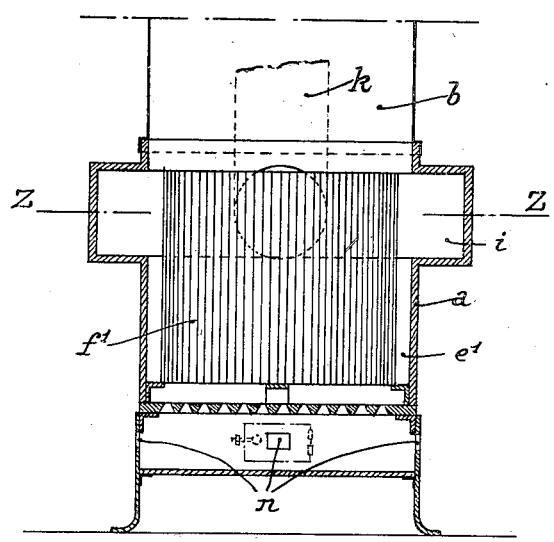
Figure 4:
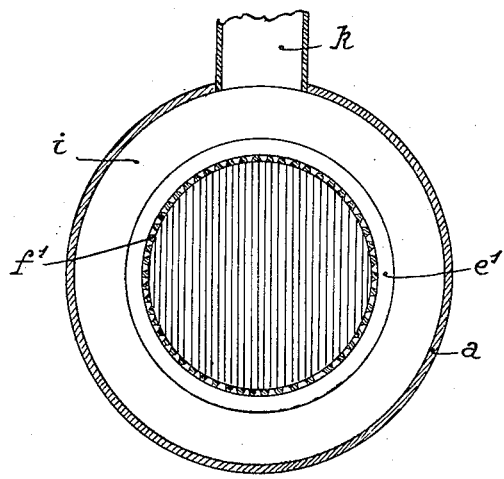
Figure 5:
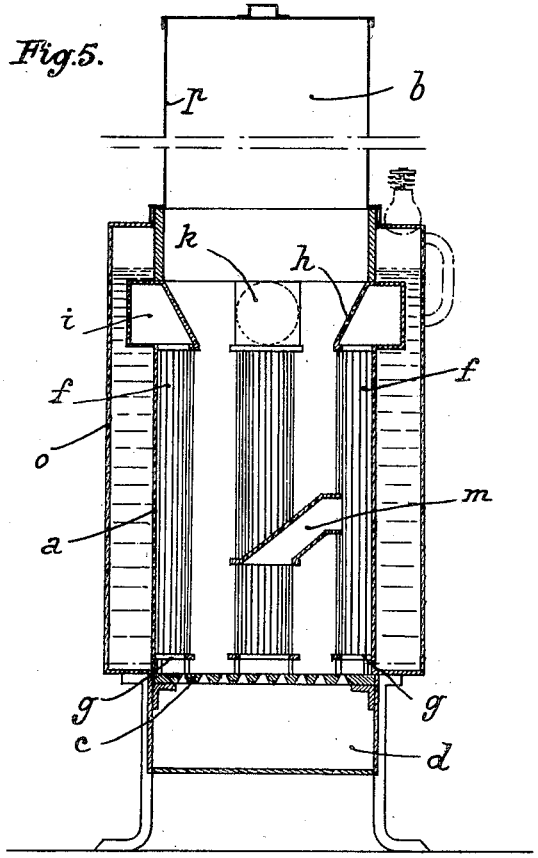
Figure 6:
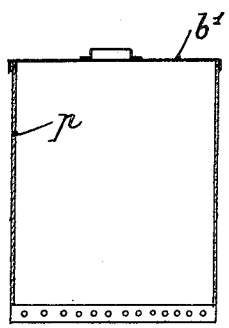
Figure 7:
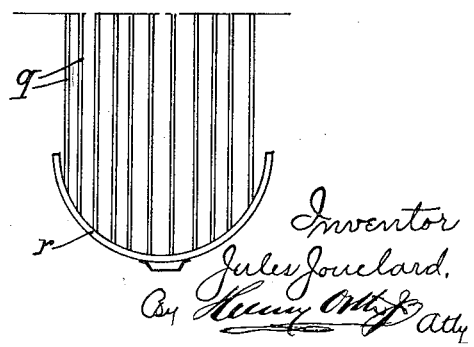
Figure 8:
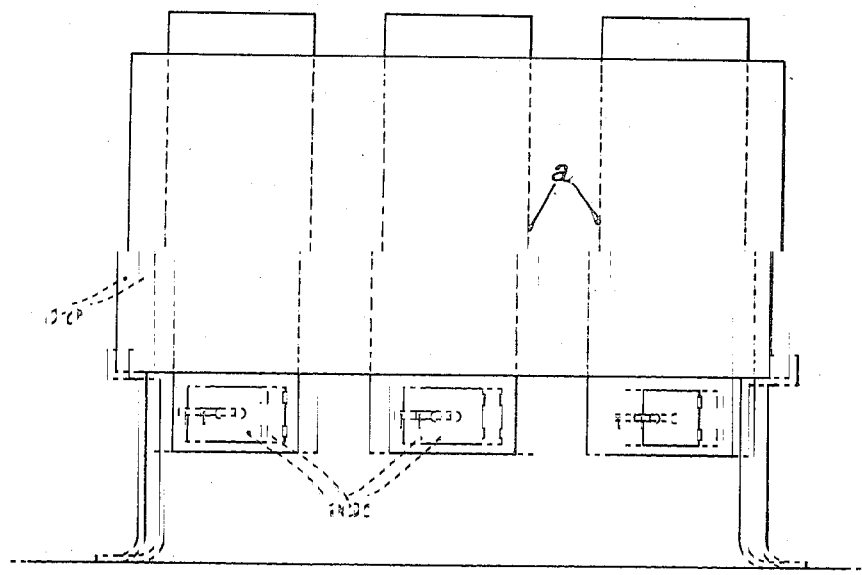
Figure 9:
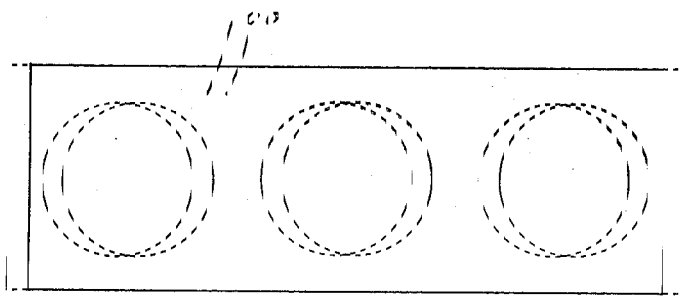
Figure 9:
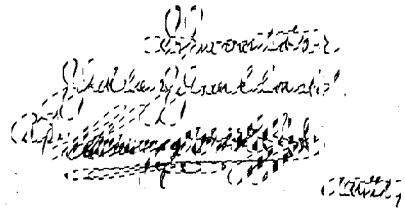
Figure 10:
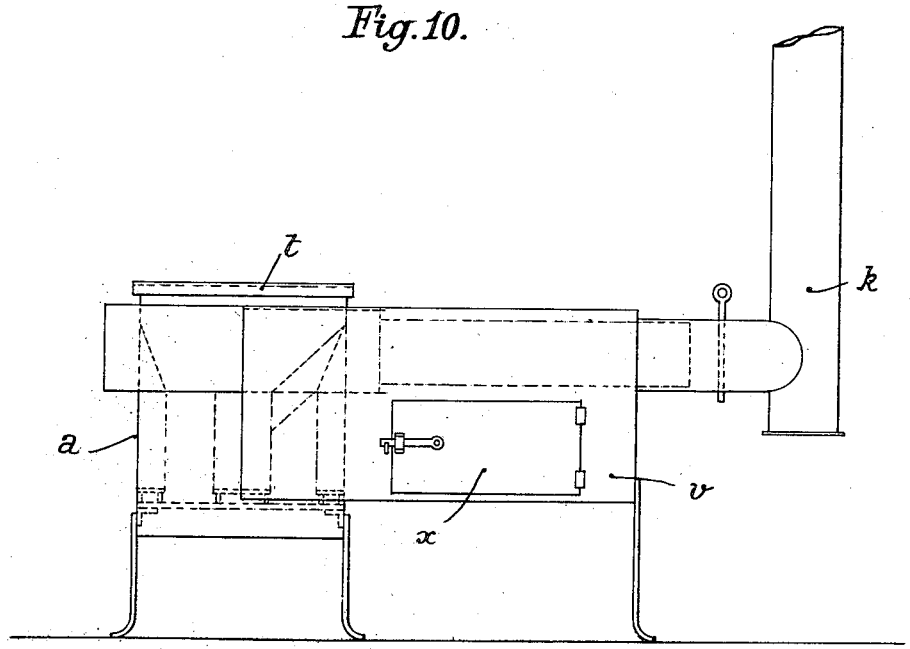
Figure 11:
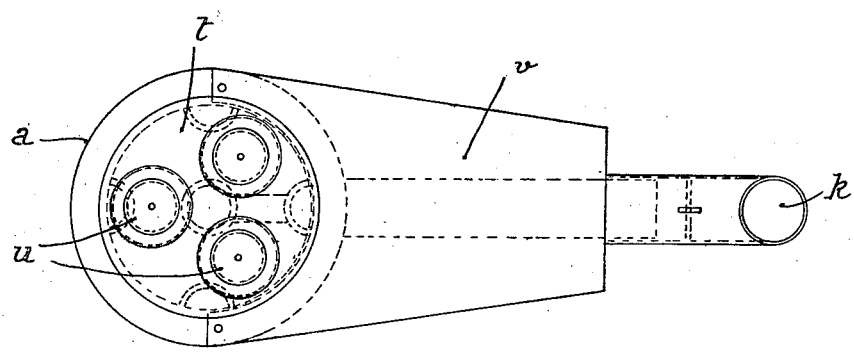
Figure 12:
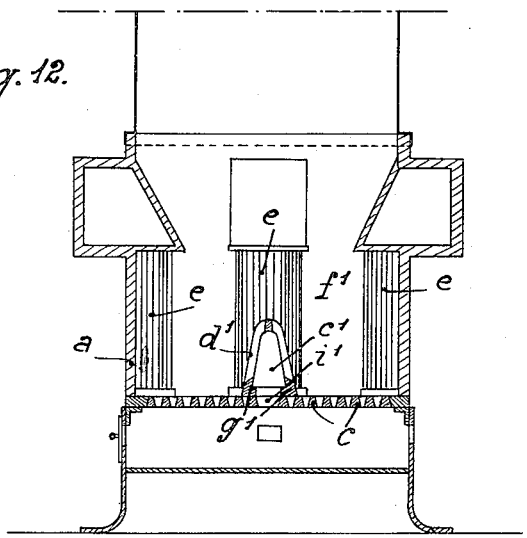
Figure 13:
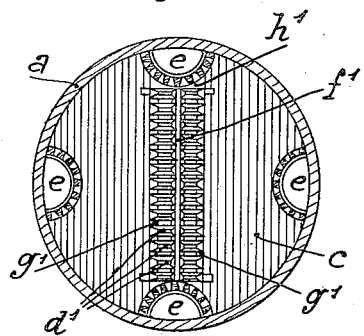
Figure 14:
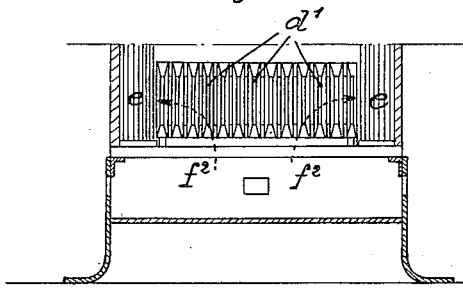

Fig. 1 is a vertical section of a sawdust burning stove according to this invention, and of the current type. Fig. 2 is a horizontal section of the same on the line X—Y Fig. 1. Fig. 3 is a vertical section of a modified form of construction which is particularly applicable to the combustion of shavings. Fig. 4 is a horizontal section of the same on the line Z—Z Fig. 3. Fig. 5 relates to the direct use of the device with an evaporating apparatus, the whole device being shown in vertical section. Figs. 6 and 7 relate to the feeding devices. Fig. 8 is an elevation of a larger sized evaporating device than the preceding, and Fig. 9 is a plan view of the same. Figs. 10 and 11 are respectively elevational and plan views of the device as applied to a kitchen range. Fig. 12 is a vertical section of a modified form of a sawdust burning stove, on a plane perpendicular to the direction of the additional passage. Fig. 13 is a horizontal section corresponding to Fig. 12. Fig. 14 is a partial vertical section in a plane perpendicular to that of Fig. 12.

Referring to Figs. 1 and 2, it is observed that the said stove comprises a cylindrical body $a$ adapted to contain the fuel, having mounted thereupon a feed hopper $b$, and terminating at the bottom in a grate $c$ which separates the same from an ash pit $d$ through which the admission of air of combustion takes place. The vertical draft-devices are so disposed as to constitute semi-cylindrical grated flues $e$ whereof four are disposed around the periphery, these being bounded by the vertical grate bars $f$ whose base $g$ is disposed adjacent the grate $c$. The interiors of the said passages are connected through the connecting members $h$ with the main discharge collecting chamber $i$ having secured thereto the end of the main outlet pipe or chimney $k$. At the central part is also disposed a cylindrical member $l$ whose surface is formed of grate bars, but the chamber thus produced may have a smaller capacity than the flues $e$ so as to cause no hindrance to the descent of the combustible. The upper part or member $l$ is also connected with the main collecting chamber $i$ by a flue $m$ either directly or through the medium of one of the said grated flues. The members $l$—$m$ may be omitted in case shavings or chips alone are burned, as seen in Figs. 3 and 4.

A modified form of construction is shown in Figs. 3 and 4. The cylindrical wall $f$ is concentric with the main body $a$ of the stove, and forms a continuous surface $f^1$ defining the combustion chamber. The discharge of gas takes place throughout the entire periphery of the annular space $e^1$ and in the main collecting chamber $i$ which is disposed as in the preceding case. A combined grating and chimney may also be disposed at the central part for burning sawdust.

The operation of the apparatus in either case will be readily understood. The air which is introduced in adjustable quantity through the apertures $n$ of the ash pit—these being preferably four in number to correspond to the four grated flues $e$—passes through the grate and easily penetrates into the mass. In the case of sawdust a very strong draught may be obtained, by the use of the cylindrical member $l$ and the grate bars $f$ which are directly in relation to the chimney and are sufficiently near each other in order that the mass of the sawdust shall not prevent the draught. Where chips or shaving are burned, the draught is on the contrary reduced by closing the orifices $l$ in an almost complete manner, whereby this fuel will not burn too rapidly. The said stove will thus afford a considerable variation in its action, and this alone will enable it to burn sawdust as well as chips and shavings or the like. But when shavings are employed, it is preferable to omit the cylindrical member $l$. Moreover, a very regular operation is afforded by reason of the hopper $b$ which always contains a certain amount of fuel.

Fig. 5 relates more particularly to the use of the said device for the production of hot water or steam. To this end, the whole outer surface of the stove as well as the surface of the collecting chamber, is surrounded by a sufficiently strong jacket $o$ which is filled with water to a determined level. This will afford a regular and rapid heating for the entire mass of water contained in the apparatus, and the latter is thus applicable to central heating and in general to all industries making use of hot water or steam, including the supply of steam engines. In case the water is to be heated to the boiling point, the jacket $o$ is provided with all the necessary devices such as pressure gauge, safety valve, water level gauge, and the like, these being shown in broken lines in Fig. 5.

This method of heating is particularly economical and rapid. By way of example, my experiments made with a stove of about 0.50 meters diameter and surrounded by a water jacket having an approximate capacity of 50 liters, showed that the boiling of the water took place after 20 minutes normal heating with sawdust as fuel.

In case it should be desired to obtain the production of steam at a very high rate and especially a high steam pressure, it is advisable to dispose a plurality of heating units surrounded by a common water jacket, as shown in Figs. 8 and 9. All these devices may be supplied with fuel with the greatest facility, by means of a feeding device as shown in Figs. 6 and 7, thus obviating all dust and smoke. The said feeding device is constituted by a simple cylindrical chamber $p$ having the same diameter as the main body of the said stove and whose bottom portion is provided with orifices for the passage of the bars $q$ forming a grating and secured to a frame $r$. For the feeding operation, the bars $q$ are introduced in the corresponding orifices of the cylinder $p$ and the sawdust or shavings are packed above the grating. The cover $b^1$ of the hopper is then removed and disposed upon the top of the cylinder $p$. This latter is then placed upon the said hopper and the frame $r$ is drawn upon in order to cause the fuel to descend.

Figs. 10 and 11 show the application of the sawdust burning stove to a kitchen range. In this case the receptacle $b$ is omitted and the feeding device is no longer required. A special plate $t$ is adapted to be disposed on the top of the stove, and it is provided with the feed apertures $u$ which are disposed as in the known devices. The chamber $v$ is disposed in the rear of the stove, being traversed by the pipe or chimney, and thus constitutes an oven having a door which is shown at $x$.

In Figs. 12 and 14, the main body of the stove, $a$, is provided with the vertical flues $e$ which are four in number in the example herein represented. The transverse passage is disposed at $c^1$ upon the bottom grate $c$ and preferably in the direction of the grate bars. The said passage is provided with inclined sides in order to permit the sawdust to slide more readily upon the same. Each of these sides is constituted by a set of grate bars $d^1$ of trapezoidal section, the spaces between bars being greatest at the outer part, as is usually carried out for the grate $c$. At the top, a longitudinal bar $f^1$ of the same section serves to connect together the said bars of the two surfaces and at the bottom part, the lugs $g^1$ are disposed adjacent the ends in order to secure the said transverse member in position. The latter member is secured preferably by means of small tenons whose shape corresponds to the interstices between the grate bars and which are fitted at each side in one of the said interstices. In this manner the said member $c^1$ is mounted and removed with great facility and rapidity. To facilitate these operations, a slight play is provided between the ends $h^1$ of the said horizontal member or passage and the corresponding flues $e$.

The operation of the device will be readily understood. The air admitted through the lower part is caused to enter the said horizontal passage through the grate $c$ and thus gives rise to currents which flow approximately according to the arrows $f^2$, Fig. 14, and which proceed into the flues $e$ leading to the chimney. This affords a large air contact surface for the sawdust, but without any corresponding hindrance to the descent of the same. The same conditions prevail when shavings or like fuel are used in the said stove. Should it be desired to provide a greater air circulation, the central bar of the grate $c$ may be removed, as shown in Fig. 12, whereby a considerable space $i^1$ will be left. This disposition is also favorable for the disengagement of the ashes. To prevent in a more reliable manner the formation of deposits of ash, the bars of the flues $e$ have been extended as far as the grate $c$, instead of resting thereupon by means of supports. It will be observed that the hereinbefore described sawdust burning stove is of a most practical nature and is applicable in the majority of cases. The above mentioned dispositions are not of a limitative nature, and the device may be suitably modified in proportions or in the details thereof without departing from the spirit of my invention.

I claim:

1. A stove comprising a cylindrical body, an ash-pit below the latter, a grate above the ash-pit, vertical grated flues for facilitating the combustion, an annular collecting chamber for the burnt gases, adjustable means whereby air required for the combustion is introduced through the ash-pit and means for feeding the stove with fuel.

2. A stove comprising a cylindrical main body, an ash-pit below the latter, a grate above the ash-pit, vertical grated flues in the body, an auxiliary grated flue disposed adjacent the center of the body, all the said grated flues facilitating the combustion, an annular collecting chamber for the burnt gases, adjustable means whereby the air required for combustion is admitted to the ash-pit, and means for supplying the stove with fuel.

3. A stove comprising a cylindrical main body, an ash-pit below the latter, a grate above the ash-pit, semicylindrical vertical grated flues disposed along the walls of the body and extending to the grate, an auxiliary grated flue disposed adjacent the center of said body for facilitating combustion, an annular collecting chamber for the burnt gases disposed at the top of the body, adjustable means whereby air required for combustion is admitted to the ash-pit, and means for supplying said stove with fuel.

4. A stove comprising a main body, a grate and an ash-pit, a vertical grate spaced from said body and forming a vertical flue between said body and grate, a collecting chamber of larger diameter than said body at the top of said flue, and said chamber having a chimney connection.

In testimony that I claim the foregoing as my invention, I have signed my name.

JULES JOUCLARD.